United States Patent
Keithley

[15] 3,668,158
[45] *June 6, 1972

[54] COMPOSITION FOR ADHERING PLASTIC FILM TO A VAPOR PENETRABLE NON-METALLIC SUBSTRATE

[72] Inventor: Robert James Keithley, Bellston Lake, N.Y.

[73] Assignee: Borden Inc., New York, N.Y.

[ * ] Notice: The portion of the term of this patent subsequent to Aug. 18, 1987, has been disclaimed.

[22] Filed: June 3, 1970

[21] Appl. No.: 43,243

[52] U.S. Cl..............260/17 R, 260/17.4 ST, 260/29.6 ME, 260/29.6 TA, 260/31.4 R, 260/31.6
[51] Int. Cl.....................................C08b 21/32, C08b 21/34
[58] Field of Search.................260/17 R, 29.6 ME, 29.6 TA, 260/31.2 R, 31.6, 31.4, 17.4

[56] References Cited

UNITED STATES PATENTS 3,355,322  11/1967  Worrall et al. ................260/29.6 WA
3,423,353  1/1969  Levine et al. ..................260/29.6 ME
3,440,199  4/1969  Lindemann et al. ...........260/29.6 ME
3,524,828  8/1970  Keithley..............................260/17 R

*Primary Examiner*—William H. Short
*Assistant Examiner*—L. M. Phynes
*Attorney*—George P. Maskas and Edward L. Mandell

[57] ABSTRACT

This invention relates to an adhesive composition for applying a plastic film of a vapor penetrable backing or core material comprising an aqueous emulsion of an aliphatic 1-olefin and a vinyl ester of a lower monocarboxylic acid, the proportions of olefin in the copolymer being from 5–25 parts by weight the proportion of vinyl ester being the necessary remainder to make 100 parts total weight of copolymer and a water dispersible non-separating combination of (1) a water soluble ester of a mono- $C_1$–$C_4$ alkyl ether of a $C_2$–$C_8$ glycol with a $C_2$–$C_4$ saturated monocarboxylic aliphatic acid and (2) a plasticizing ester of glycerin with saturated $C_2$–$C_4$ monocarboxylic aliphatic acid, the ester of the said ether and the plasticizing ester being dispersed in substantially non-separating condition in the aqueous phase of the emulsion.

11 Claims, No Drawings

COMPOSITION FOR ADHERING PLASTIC FILM TO A VAPOR PENETRABLE NON-METALLIC SUBSTRATE

DESCRIPTION

The invention is particularly useful in the application of a vinyl chloride and other plastic films or sheets to a penetrable substrate, e.g., wood, cardboard, fiber board, particle or flake board, paper and woven and knitted fabrics.

In making such products, it is customary to ply the plastic sheeting, with an adhesive coating thereon, to the surface of the core or backing material and then send the assembly through the nip between several pairs of rotated, compressing rollers in series arrangement. To obtain proper adherence of the plastic sheeting to said material during the short time during which pressure is applied has been a problem.

The present invention provides adhesive compositions which develop proper tackiness and bond strength before the adhesive film is completely or even largely dried and solve the problem.

The invention comprises the herein described adhesive in the form of an aqueous emulsion including a resin copolymer component which comprises an aliphatic l-olefin and a vinyl ester of a monocarboxylic acid, a special coalescing agent and a plasticizer combination, and suitably also a thickener.

The resin copolymer comprises an aliphatic l-olefin and a vinyl ester of a low monocarboxylic acid. The aliphatic l-olefin has from two to five carbons and is preferably ethylene. The vinyl ester component is derived from a monocarboxylic acid having from one to seven carbons such as vinyl acetate, vinyl propionate, vinyl formate and the like. The proportions of olefin in the copolymer can be from about 5–25 parts by weight, the proportion of vinyl ester being the necessary remainder, i.e., 75–95 parts by weight to make 100 parts total weight of copolymer. Preferably the proportion of olefin is from 10–18 parts by weight. The preferred copolymer is ethylene-vinyl acetate. This copolymer is well known to the art and is commercially available from several sources. One such commercial product which is particularly preferred is Aircoflex 400 made by the Air Reduction Company.

The methods for preparing the aliphatic-olefin-vinyl ester copolymers is known and exemplified in U.S. patent Nos. 2,983,696; 2,703,794; 2,414,311 and in copending patent application Ser. No. 874,410 filed Nov. 5, 1969, entitled, "Preparation of Ethylene/Vinyl Acetate Copolymers."

In addition to the named monomers used to make the vinyl acetate-ethylene copolymers of this invention, small amounts up to about 10 percent and suitably up to about 3 percent of a functional reactive comonomer can be included. Such comonomers may provide polar groups to assist adhesion of the vinyl acetate ethylene copolymer to the substrate to which it will eventually be applied or they may have the function of providing means for cross-linking and thus contribute to strengthening and making more resistant the adhesive bond. Such coreactive functional monomers can include carboxy compounds such as acrylic acid, methacrylic acid, itaconic acid, aconitic acid, maleic acid, fumaric acid, and the dimer of methacrylic acid. In the case of polycarboxylic monomers the low alkyl monoesters of these acids are also suitable such as mono-methyl maleate, mono-ethyl fumarate, and mono-butyl itaconate. Functional reactive monomers can also be chosen from the vinyl esters of polybasic acids such as divinyl adipate, divinyl succinate, and divinyl itaconate; from allyl esters of polyfunctional acids such as diallyl fumarate, triallyl cyanurate, and diallyl vinyl citrate; other functional comonomers are divinyl ether and diallyl ether. Postreactive types of cross-linking comonomers include glycidyl compounds such as glycidyl acrylate, glycidyl methacrylate, glycidyl vinyl ether, and glycidyl allyl ether; also N-alkylol compounds such as N-methylolacrylamide, N-methylol methacrylamide, and N-ethylol acrylamide.

Satisfactory coalescing agents are the appreciably or freely water soluble esters or mixed esters of mono-$C_{1-4}$ alkyl ethers of any glycol having two to eight carbon atoms to the molecule, examples being the methyl, ethyl, propyl and butyl ethers of ethylene, propylene, butylene glycols and di- or other polyglycols thereof, esterified with a $C_{2-4}$ aliphatic saturated acid, namely, acetic, propionic and butyric, or mixtures of said esters, the glycol ether and acid being so selected from the groups stated as to make an ester having substantially solubility in water; an example is the acetate of the monobutyl ether of ethylene glycol ("Butyl Cellosolve" acetate).

As the plasticizer which, in combination with the glycol ether ester of kind described, promotes the desired "grabbing" or development of tackiness and strength before the aqueous coating film of the emulsion of the adhesive is completely dried, glycerine triacetate (triacetin) and the tributyrate (tributyrin) illustrate the class that gives the desired results. For some purposes I may use also the mono- di- and tri- $C_{2-4}$ aliphatic acid esters of glycerin e.g., mono- and diacetin, mono-, di-, or tripropionate or butyrate esters of glycerin. The lower members of the series give better overall results. Triacetin and tributyrin, illustrating a suitable range of solubility of the plasticizer, dissolve to the extent of about 7 parts and 0.02 parts respectively, in 100 parts of water at 20° C. They are infinitely soluble in dry coalescing agents of kind described herein.

In general, I select a combination of coalescing agent and plasticizer, from the groups given, as tested by stirring in water alone, so that the combination is water dispersible to an emulsion that is non-separating. There is thus prevented separation of these active solvents for the resin, either by settling or rising of them in the applied adhesive film, either of which, if occurring, would cause layering out of said solvents in excessive concentration on a face of the film, in contact with one of the surfaces to be adhered and thus weaken the adhesive strength at the critical zone of adhesion.

Thickeners which are satisfactory for the present purpose also are water dispersible, examples being alkyl and hydroxyalkyl celluloses such as "Natrosol 250 H" (hydroxyethyl cellulose), hydroxymethyl cellulose, ethyl hydroxyethyl cellulose, the sodium salt of carboxymethyl cellulose, and the homopolymer of ethylene oxide (polyethylene oxide) of molecular weight 4,000 to 4,000,000, such as "Polyox WSR" 35, 205, or 301. Polysacchoride gums (Cf. Kirk & Othmer, Encyclopedia of Chemical Technology, Vol. 11, page 6, 1953) may be used as thickeners, for instance, karaya, locust bean, tragacanth, or guar gum. The thickener used is of kind and in amount to provide suitable rheological properties for application of the adhesive to the substrate.

Proportions of the several components on the dry basis that are permissible and others that are recommended in commercial adhesive formulations are shown in the following table.

| ingredient | Parts by Weight for 100 Parts Co-polymer of Aliphatic 1-Olefin-Vinyl Ester | |
|---|---|---|
| | Permissible | Recommended |
| Coalescing agent, e g., Butyl Cellosolve acetate | 3–15 | 4–7 |
| Triacetin or like plasticizer | 2–15 | 7–10 |
| Thickener to make viscosity of whole mix at 20°c., about 10–$\phi$ poises | 0.005–2 | 0.1–0.75 |
| Water | 70–110 | 75–90 |

The viscosity range stated in the table above is for an emulsion of 50 percent "solids," i.e., non-water materials. The viscosity for a given set of proportions will vary in expected manner with concentration of the solids.

The proportion of the thickener to give the viscosities varies with the thickener selected. For the preferred viscosity of 20–40 poises, the amount of Polyox when used is suitably about 0.005 – 1 percent of the weight of the emulsion, the exact amount required being generally inversely proportional to the molecular weight. For the various polysaccharide gums, a suitable proportion is approximately 0.2 to 1.5 percent of the emulsion.

As to conditions, I compound the ingredients in any manner usual in this art. Ordinarily, I add a preformed mixture of the coalescing agent and plasticizer to the copolymer latex, a commercial aqueous emulsion containing about 55 percent solids, and stir the mix until the initial thickening that may occur disappears or until uniformity results. Then I stir in the thickener which, before its admixture, is suitably either swollen in water or mixed with a portion of said coalescing agent and then with water. Alternatively, the thickener may be slurried in the mixed agent and plasticizer and the slurry then mixed into the latex.

The invention will be further described in connection with the following specific examples or the practice of it, proportions here and elsewhere herein being expressed as parts by weight unless specifically stated to the contrary.

EXAMPLE 1

| Formula A: Component | Parts by Weight (Dry) |
| --- | --- |
| Copolymer A (vinyl acetate 80% and ethylene 20%, 55% emulsion) | 100 |
| Triacetin | 10 |
| Methyl Cellosolve acetate ($CH_{3O}$-$C_2H_4$-$OOCCH_3$) | 5 |
| Natrosol 250 H | 0.75 |

A part of the triacetin and the Methyl Cellosolve acetate were premixed and slowly added to the stirred copolymer latex. The resulting blend was stirred until the initial thickening resulting from the addition of the plasticizer-coalescing agent blend had disappeared and the mix had become smooth. Next introduced was the required amount of Natrosol 250 H which had been previously wet with an equal weight of Methyl Cellosolve acetate, i.e., with the remainder thereof, and then dissolved in sufficient water to yield a solution of 3 percent solids concentration. The whole was then agitated and mixed thoroughly.

The final product was an emulsion that showed no settling in 6 month's standing, had a viscosity between 30 and 40 poises, on the average for many batches, pH 4.5–5, and weight per gallon 8.97 lbs. Dried films of the adhesive on glass were clear and water-white.

This emulsion on a cellulosic substrate has shown a "grab" time (period of developing tack and strength of the adhesive film) of 60–90 seconds, the exact time depending on the exact nature of the substrate. The product was non-staining.

The following controls B and C are not part of the invention. They show failure of (1) the coalescing agent with an insoluble plasticizer and (2) a soluble plasticizer with no coalescing agent for the present purpose.

| Control B: | Dry Weight |
| --- | --- |
| Copolymer A of Formula A | 100 |
| Dioctyl adipate* | 10 |
| Methyl Cellosolve acetate | 5 |
| Natrosol 250 H, 3% solution | 0.75 |
| *To replace triacetin | |

The compounding was effected with the same mixing procedure as given for Formula A above. The product failed to show grab on any substrate until after 90 seconds' drying. Because of the emulsifying power and the emulsifier in the latex of copolymer A and its milkiness, it is not to be expected that any visible separation of the adipate plasticizer would appear. It is considered, however, that lack of the balance of hydrophylic and lipophylic properties required in the agent-plasticizer combination, for the quick grab of the adhesive, is a factor in the failure.

| Control C: | Dry Weight |
| --- | --- |
| Copolymer A of Formula A | 100 |
| Triacetin | Ethanol, 95% 0 (several grades used separately)* | 
| Natrosol 250 H, 3% solution | 5 0.75 |
| *To replace Methyl Cellosolve acetate | |

Although Control C also was prepared with the mixing procedure employed for Formula A, the resulting products showed no grab until after 90 seconds.

EXAMPLE 2

The procedure and composition outlined under Example 1, Formula A, were used except that the triacetin therein used was replaced by tributyrin. Also, the Methyl Cellosolve acetate used therein was replaced, separately and in turn, by equal amounts of Butyl Cellosolve acetate, and Butyl Carbitol acetate (acetate of butyl ether of diethylene glycol).

In a modification of this example, the triacetin of Formula A is replaced by an equal weight of a mixture of 50 percent triacetin and 50 percent tributyrin.

EXAMPLE 3

The procedure and composition of Example 1, Formula A are used except that the Natrosol thickener was replaced, separately and in turn, by 0.1 part of Polyox WSR-35 (average M.W. about 200,000) 0.5 part of locust bean gum, 0.5 part of tragacanth and 0.5 part of guar gum, the mixing and other operations being otherwise exactly as described in Example 1.

The properties of the products of Examples 2 - 4 are satisfactory.

EXAMPLE 4

The adhesive of Example 1, Formula A was applied by reverse roll coater to the underside of a vinyl chloride sheet to a depth wet of about 2 mils in thickness and the thus adhesively coated sheet immediately plied to the surface of sized, compressed paper board. The assembly was then passed through a series of rollers adjusted to a pressure of approximately 20 psi. at the nip, at a speed of about 25 feet per minute. Total time in the nip was of the order of 1–2 seconds. Within about 60 seconds, strength of adhesive had developed, as shown here by the bond of the adhesive being sufficient to cause fiber tear in the substrate under forced delamination from the vinyl chloride sheet.

EXAMPLE 5

This example provides an adhesive for application to relatively less porous substrates, such as plywood, poplar sheeting or highly compressed wood-fiber board. In order to obtain good bond strength and adhesive penetration on such substrates, it is necessary to reduce the solids of the adhesive emulsion to approximately 48 to 50 percent. If this solids reduction is done with additional water, a retardation of "grab" results, with the time of grab being ordinarily increased to about 70–120 seconds or more, the exact time depending on film thickness and porosity of the substrate. If, however, the solids reduction is accomplished in part with an organic liquid diluent such as benzene, tetrahydro-furane, or a chlorinated hydrocarbon, e.g., methylene chloride, all of evaporation rate above that of water, very little slowing of grab occurs, grab times of 30–50 seconds duration persisting. Yet the property of penetrating the substrate and developing adequate bond strength remains.

An example of a formulation for such purpose is:

| | Parts, Dry Basis |
| --- | --- |
| Copolymer A emulsion, Example 1 | 100 |

| | |
|---|---|
| Triacetin | 10 |
| Methyl Cellosolve Acetate | 5 |
| Natrosol 250 H | 0.7 |
| Tributyl stannic oxide | 0.5 |
| Benzene (diluent) | 13.5 |

The amount of diluent used to replace the water of dilution may vary within the range about 5 – 15 parts for 100 parts of said copolymer. Lesser amounts are ineffectual and larger amounts defeat the purpose, by reversing the speed up of grab, to an actual slowing down thereof.

It will be understood that it is intended to cover all changes and modifications of the examples of the invention herein chosen for the purpose of illustration which do not constitute departures from the spirit and scope of the invention.

What is claimed is:

1. An adhesive emulsion comprising
   A. water,
   B. a resin component containing copolymerized therein an aliphatic l-olefin having from two to five carbons and a vinyl ester of a lower monocarboxylic acid having one to seven carbons, the proportion of olefin in said resin component being from five to 25 parts by weight, the proportion of vinyl ester being the necessary remainder to make 100 parts total weight of said resin component and
   C. a water dispersible non-separating combination of
      1. a water-soluble coalescing agent selected from the esters of mono- $C_{1-4}$ alkyl esters of $C_{2-8}$ glycols with $C_{2-4}$ saturated monocarboxylic aliphatic acids and
      2. a plasticizing ester of glycerin with a saturated $C_{2-4}$ monocarboxylic aliphatic acid, said coalescing agent and plasticizing ester being dispersed in substantially non-separating condition in the aqueous phase of the emulsion.

2. The adhesive emulsion of claim 1, the proportions by weight being about 3–15 parts of the coalescing agent and 2–15 parts of the plasticizing ester for 100 parts of said resin component.

3. The adhesive emulsion of claim 1, including an admixed thickener in the amount to raise the viscosity of the emulsion to about 10 – 100 poises at 20° C.

4. The adhesive emulsion of claim 1, including an admixed thickener selected from the group consisting of the water dispersible alkyl and hydroxyalkyl celluloses, sodium salt of carboxymethyl cellulose, polysaccharide gums, and polyoxyethylene of molecular weight within the range 4,000 to 4,000,000, the proportion of the thickener being that giving to the emulsion a viscosity of about 10 –100 poises at 20° C. when the proportion of water in the emulsion is approximately 40 percent of the total weight thereof.

5. In the emulsion of claim 4, said thickener being hydroxyethyl cellulose.

6. An adhesive emulsion consisting essentially of the following components in proportion by weight approximately as follows: 70–110 parts of water, 100 parts of a copolymer of vinyl acetate and ethylene, the proportions by weight of the monomers copolymerized in 100 parts by weight of said copolymer being 75–95 parts vinyl acetate and correspondingly 5–25 parts of ethylene, 3–15 parts of the acetate of the monobutyl ether of ethylene glycol, 2–15 parts of tributyrin, and 0.005–2 parts of hydroxyethyl cellulose.

7. The adhesive emulsion of claim 4, said thickener being polyoxyethylene of average molecular weight about 200,000.

8. The adhesive emulsion of claim 3, said thickener being guar gum.

9. The adhesive emulsion of claim 1, including an admixed organic liquid diluent, the diluent being of evaporation rate above that of water and in the proportion of about 5–15 parts by weight for 100 parts of said copolymer.

10. The adhesive emulsion of claim 1, wherein the resin component is ethylene-vinyl acetate, ethylene being present in an amount of from 10–18 parts by weight, the amount of vinyl acetate being the necessary remainder to make 100 parts total weight of copolymer.

11. An adhesive emulsion comprising
   A. water,
   B. a resin component containing polymerized therein
      i. an aliphatic l-olefin having from two to five carbons,
      ii. a vinyl ester of a lower monocarboxylic acid having from one to seven carbons, and
      iii. a functionally reactive comonomer, selected from the group consisting of acrylic acid, methacrylic acid, itaconic acid, aconitic acid, maleic acid, fumaric acid, methacrylic acid dimer, the monoesters of maleic, fumaric and itaconic acids with $C_1$–$C_4$ alkanols, divinyl adipate, divinyl succinate, divinyl itaconate, diallyl fumarate, triallyl cyanurate, diallyl vinyl citrate, glycidyl acrylate, glycidyl methacrylate, glycidyl vinyl ether, glycidyl allyl ether, N-methylolacrylamide, N-methylolmethacrylamide and N-ethylolacrylamide, the proportion of olefin in the resin component being from 5–25 parts by weight, the proportion of functionally reactive comonomer being from 3–10 parts by weight and the proportion of vinyl ester being the necessary remainder to make 100 parts total weight of resin component,
   C. A water dispersible non-separating combination of
      i. a water-soluble coalescing agent selected from the esters of mono-$C_{1-4}$ alkyl ethers of $C_{2-8}$ glycols with $C_{2-4}$ saturated monocarboxylic aliphatic acids and
      ii. a plasticizing ester of glycerin with a saturated $C_{2-4}$ monocarboxylic aliphatic acid, said coalescing agent and plasticizing ester being dispersed in substantially non-separating condition in the aqueous phase of the emulsion and being in weight proportion corresponding to about 3–15 parts of coalescing agent and 2–15 parts of plasticizing esters for 100 parts of said resin component.

* * * * *

UNITED STATES PATENT OFFICE
CERTIFICATE OF CORRECTION

Patent No. 3,668,158                 Dated June 6, 1972

Inventor(s) Robert James Keithley

It is certified that error appears in the above-identified patent and that said Letters Patent are hereby corrected as shown below:

In Column 2, line 63 "0" should be changed to --100--.

In Column 4, lines 11-12 --Ethanol, 95% (Several grades used separately)--* should start at the margin.

Signed and sealed this 24th day of October 1972.

(SEAL)
Attest:

EDWARD M. FLETCHER, JR.
Attesting Officer

ROBERT GOTTSCHALK
Commissioner of Patents